United States Patent
Koch et al.

(10) Patent No.: US 7,908,381 B2
(45) Date of Patent: *Mar. 15, 2011

(54) SIMULTANEOUS VISUAL AND TELEPHONIC ACCESS TO INTERACTIVE INFORMATION DELIVERY

(75) Inventors: Robert A. Koch, Norcross, GA (US); Hamish M. Caldwell, Decatur, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 369 days.

This patent is subject to a terminal disclaimer.

(21) Appl. No.: 11/416,287

(22) Filed: May 1, 2006

(65) Prior Publication Data
US 2006/0200569 A1 Sep. 7, 2006

Related U.S. Application Data

(63) Continuation of application No. 09/894,206, filed on Jun. 28, 2001, now Pat. No. 7,054,939.

(51) Int. Cl.
*G06F 15/16* (2006.01)

(52) U.S. Cl. ........ 709/227; 709/203; 709/217; 709/228; 709/219; 379/142.15; 379/93.09; 379/93.11; 379/88.13; 379/90.01; 379/202.01; 379/205.01; 370/260; 370/261; 370/265

(58) Field of Classification Search .................. 709/203, 709/217, 228, 219, 227; 379/142.15, 93.09, 379/93.11, 88.13, 90.01, 202.01, 205.01; 370/260, 261, 265

See application file for complete search history.

(56) References Cited

U.S. PATENT DOCUMENTS

| | | | | |
|---|---|---|---|---|
| 5,479,487 A | * | 12/1995 | Hammond | 379/88.22 |
| 5,533,103 A | | 7/1996 | Peavey et al. | 379/69 |
| 5,615,351 A | | 3/1997 | Loeb | 700/90 |
| 5,659,599 A | | 8/1997 | Arumainayagam et al. | 379/67.1 |
| 5,745,556 A | | 4/1998 | Ronen | 379/127.05 |
| 5,802,526 A | * | 9/1998 | Fawcett et al. | 379/88.13 |
| 5,838,682 A | * | 11/1998 | Dekelbaum et al. | 370/401 |
| 5,884,312 A | * | 3/1999 | Dustan et al. | 1/1 |
| 5,943,321 A | | 8/1999 | St-Hilaire et al. | 370/259 |

(Continued)

OTHER PUBLICATIONS

Danielsen, P.J, "The promise of a voice-enabled Web," Computer, Aug. 2000, vol. 33, Issue: 8, pp. 104-106.*

(Continued)

*Primary Examiner* — Dohm Chankong
(74) *Attorney, Agent, or Firm* — Greenblum & Bernstein P.L.C.

(57) ABSTRACT

The functionality of Advanced Intelligent Network (AIN) components and Internet-based resources are integrated to provide simultaneous visual and telephonic access to an interactive information delivery system. The present invention enhances conventional Interactive Voice Response (IVR) systems by simultaneously providing visual information that corresponds to the voice-based information that is delivered telephonically. A user that contacts a conventional IVR service provider (IVR host) can be provided with the option of a Visual IVR (VIVR) session. The VIVR session can provide visual information to the user in the form of HTML-formatted web pages delivered over an Internet connection and will provide audible message information over a conventional wireless or wireline voice telephone connection. A VIVR session can coordinate the delivery of visual information (e.g., web pages) and the delivery of telephony-based information (e.g., audio file playback) such that the user hears an audible message on the telephone that corresponds to the information displayed on a networking device. The user may provide instructions to a VIVR Server over either the telephone or the networking device. The VIVR Server will respond to instructions received by either the telephone connection or the Internet connection.

20 Claims, 7 Drawing Sheets

U.S. PATENT DOCUMENTS

| | | | | |
|---|---|---|---|---|
| 6,070,185 | A | 5/2000 | Anupam et al. | 709/204 |
| 6,101,473 | A | 8/2000 | Scott et al. | 704/275 |
| 6,130,933 | A * | 10/2000 | Miloslavsky | 379/90.01 |
| 6,157,705 | A | 12/2000 | Perrone | 379/88.01 |
| 6,195,357 | B1 * | 2/2001 | Polcyn | 370/401 |
| 6,196,846 | B1 * | 3/2001 | Berger et al. | 434/118 |
| 6,203,495 | B1 | 3/2001 | Bardy | 600/301 |
| 6,226,285 | B1 * | 5/2001 | Kozdon et al. | 370/352 |
| 6,240,449 | B1 | 5/2001 | Nadeau | 709/223 |
| 6,256,389 | B1 * | 7/2001 | Dalrymple et al. | 370/352 |
| 6,292,480 | B1 * | 9/2001 | May | 370/352 |
| 6,295,551 | B1 * | 9/2001 | Roberts et al. | 709/205 |
| 6,311,231 | B1 * | 10/2001 | Bateman et al. | 379/265.09 |
| 6,332,154 | B2 * | 12/2001 | Beck et al. | 709/204 |
| 6,337,858 | B1 * | 1/2002 | Petty et al. | 370/356 |
| 6,389,132 | B1 | 5/2002 | Price | 379/265.01 |
| 6,418,199 | B1 | 7/2002 | Perrone | 379/88.01 |
| 6,430,174 | B1 * | 8/2002 | Jennings et al. | 370/352 |
| 6,430,176 | B1 * | 8/2002 | Christie, IV | 370/355 |
| 6,438,599 | B1 | 8/2002 | Chack | 709/219 |
| 6,456,699 | B1 * | 9/2002 | Burg et al. | 379/88.17 |
| 6,459,774 | B1 | 10/2002 | Ball et al. | 379/67.1 |
| 6,459,776 | B1 | 10/2002 | Aktas et al. | 379/88.13 |
| 6,493,447 | B1 * | 12/2002 | Goss et al. | 379/265.09 |
| 6,567,848 | B1 * | 5/2003 | Kusuda et al. | 709/219 |
| 6,587,822 | B2 | 7/2003 | Brown et al. | 704/275 |
| 6,587,880 | B1 | 7/2003 | Saigo et al. | 709/217 |
| 6,600,736 | B1 * | 7/2003 | Ball et al. | 370/352 |
| 6,625,139 | B2 * | 9/2003 | Miloslavsky et al. | 370/352 |
| 6,631,186 | B1 | 10/2003 | Adams et al. | 379/201.12 |
| 6,636,831 | B1 * | 10/2003 | Profit et al. | 704/275 |
| 6,654,815 | B1 * | 11/2003 | Goss et al. | 709/248 |
| 6,658,389 | B1 | 12/2003 | Alpdemir | 704/275 |
| 6,668,286 | B2 | 12/2003 | Bateman et al. | 710/6 |
| 6,678,718 | B1 | 1/2004 | Khouri et al. | 709/204 |
| 6,708,215 | B1 * | 3/2004 | Hingorani et al. | 709/229 |
| 6,718,017 | B1 | 4/2004 | Price et al. | 379/88.22 |
| 6,751,211 | B1 * | 6/2004 | Chack | 370/352 |
| 6,754,693 | B1 * | 6/2004 | Roberts et al. | 709/205 |
| 6,788,774 | B1 | 9/2004 | Caldwell et al. | 379/201.03 |
| 6,807,254 | B1 * | 10/2004 | Guedalia et al. | 379/88.1 |
| 6,823,047 | B1 * | 11/2004 | Cruickshank | 379/88.18 |
| 6,823,384 | B1 * | 11/2004 | Wilson et al. | 709/225 |
| 6,871,212 | B2 * | 3/2005 | Khouri et al. | 709/204 |
| 6,920,425 | B1 * | 7/2005 | Will et al. | 704/275 |
| 7,068,643 | B1 * | 6/2006 | Hammond | 370/352 |
| 7,092,370 | B2 * | 8/2006 | Jiang et al. | 370/329 |
| 7,472,352 | B2 * | 12/2008 | Liversidge et al. | 715/758 |
| 2001/0024497 | A1 | 9/2001 | Campbell et al. | 379/265.09 |
| 2002/0078151 | A1 * | 6/2002 | Wickam et al. | 709/204 |
| 2002/0085701 | A1 * | 7/2002 | Parsons et al. | 379/211.01 |
| 2002/0107918 | A1 | 8/2002 | Shaffer et al. | 709/203 |
| 2002/0112081 | A1 * | 8/2002 | Armstrong et al. | 709/246 |
| 2002/0164000 | A1 | 11/2002 | Cohen et al. | 379/88.17 |
| 2003/0051037 | A1 | 3/2003 | Sundaram et al. | 709/227 |
| 2003/0083882 | A1 | 5/2003 | Schemers, III et al. | 704/270.1 |
| 2003/0120748 | A1 | 6/2003 | Begeja et al. | 709/217 |
| 2004/0019638 | A1 | 1/2004 | Makagon et al. | 709/204 |

OTHER PUBLICATIONS

Ball et al, "Speech-Enabled services using TelePortal software and VoiceXML," Bell Labs Technical Journal, 2000, vol. 5, pp. 98-111.*

* cited by examiner

SIMULTANEOUS VISUAL AND TELEPHONIC ACCESS TO INTERACTIVE INFORMATION DELIVERY

CROSS REFERENCE TO RELATED APPLICATIONS

This application is a continuation of U.S. patent application Ser. No. 09/894,206, entitled "Simultaneous Visual and Telephonic Access to Interactive Information Delivery," filed Jun. 28, 2001, now U.S. Pat. No. 7,054,939 said application incorporated herein by reference.

FIELD OF THE INVENTION

The present invention generally relates to providing access to an interactive information delivery system. More particularly, the present invention relates to supporting both voice-based and visual-based content delivery by using both telephone-based and network-based access points to an interactive information delivery system.

BACKGROUND OF THE INVENTION

One of the challenges facing electronic commerce (e-commerce) is overcoming the propensity of Internet consumers to improperly navigate an e-commerce website. In fact, many Internet consumers abandon selected products (e.g., products placed in a shopping cart) before completing an Internet purchase transaction. Usability studies indicate that many abandoned sales transactions directly result from the Internet consumer's inability to navigate the e-commerce website.

Many e-commerce websites have taken steps to make user navigation easier by simplifying the e-commerce website. However, e-commerce retailers market their products to consumers having a variety of computer skills. Consequently, many efforts to simplify the navigation of a website, may result in frustrating more sophisticated consumers. Another approach to simplifying website navigation has been to provide an online assistant. Typically, the online assistant is a human operator that communicates with the e-commerce consumer via a messaging system. Unfortunately, this approach is very expensive, because it requires a staff of operators to support the e-commerce website.

Similar problems exist in the area of automated telephone information systems. Such systems are often referred to as Interactive Voice Response (IVR) systems and are used to provide information and/or call routing by leading a user through a series of menu-driven prompts. For example, IVR systems are commonly used to automate voicemail systems or customer service systems. IVR Systems are commonly used for automating customer service call routing and automated account information (e.g., bank account information). Often, users of IVR systems have problems navigating through the menu tree. Such users often abandon their quest for information and terminate the telephone call, prior to reaching the sought information. When a user abandons an automated information delivery system, the user will typically seek a human attendant to contact to provide the information originally sought. This increases the demand for human operators to support the IVR system. Operators add unnecessary expense to the cost of operating an automated information delivery system.

In addition, because users are required to traverse a menu tree, it is common that users become frustrated with menu-driven information delivery systems and resort to contacting a human operator. Typically menu-driven information delivery systems do not enable the user to jump directly to the desired information and/or service, but require that the user traverse a predefined path through the menu tree to the user's objective.

Therefore, there is a need in the art for an information delivery system that reduces the occurrence of user abandonment. The information delivery system should combine the functionality of a website-based information delivery system and a telephone-based information delivery system. The information delivery system also should provide integrated user interaction, whereby the web-based information delivery system is responsive to commands issued by a user via the telephone-based information delivery system and vice-versa. Finally, the information delivery system should provide short cuts to enable a user to quickly access information and eliminate repetitive menu traversals.

SUMMARY OF THE INVENTION

The present invention integrates components of an Advanced Intelligent Network (AIN) with Internet—based resources to provide simultaneous visual and telephonic access to an interactive information delivery system. The present invention enhances conventional Interactive Voice Response (IVR) systems by enabling the simultaneous delivery of visual information that corresponds to the voice-based information that is delivered telephonically. A user that contacts an IVR service provider (IVR host) by telephone is provided with the option of a Visual IVR (VIVR) session, rather than the conventional voice-only (i.e., telephony-based) IVR session. The user will only be provided the VIVR session option if a determination is made that the user has an existing Internet connection that will support a VIVR session. The VIVR session provides visual information to the user in the form of visually formatted web pages delivered over an Internet connection and provides audible message information over a conventional voice telephone connection.

A VIVR session can enable the delivery of visual information and the delivery of telephony-based information such that the user hears an audible message on the telephone that corresponds to the information displayed on a networking device (e.g., a computer running a conventional web browser). The user may provide instructions to a VIVR Server over either the telephone (e.g., using voice commands or DTMF key code commands) or the networking device (e.g., selecting a hyperlink). The VIVR Server will respond to instructions received by either the telephone connection or the Internet connection and will modify the delivery of the voice-based and visual-based information, accordingly.

A VIVR session can be enabled based on the existence of a VIVR Session ID in a Session ID database. The presence of the VIVR Session ID in the Session ID database indicates that the user has an active Internet connection that can support a VIVR session. The absence of a VIVR Session ID in the Session ID database indicates that the user does not have such an Internet connection. In response to a determination that an applicable VIVR Session ID is present in the Session ID database, the VIVR Server can prompt a user to initiate a VIVR session.

The present invention incorporates the functionality of a telephone-based information delivery system with that of a website-based information delivery system. The integrated functionality of the information delivery systems is provided by interconnections between a wireline or wireless telephone system and the Internet. By enabling an Advanced Intelligent Network (AIN) Service Control Point (SCP) to communicate over the Internet using accepted Internet standards (e.g., TCP/

IP), the present invention integrates the functionality of a VIVR application server with a Voice XML (VXML) gateway. The functionality of the visual and voice information is coordinated by use of a Session ID database. The integration of these subsystems permits the simultaneous delivery of visual information via the Internet and voice information via a telephone connection. The user may issue commands through either the voice-based system or the visual-based system and both systems will respond to the issued commands.

The various aspects of the present invention may be more clearly understood and appreciated from a review of the following detailed description of the disclosed embodiments and by reference to the drawings and claims.

DETAILED DESCRIPTION

Exemplary Operating Environments

Figure 1:
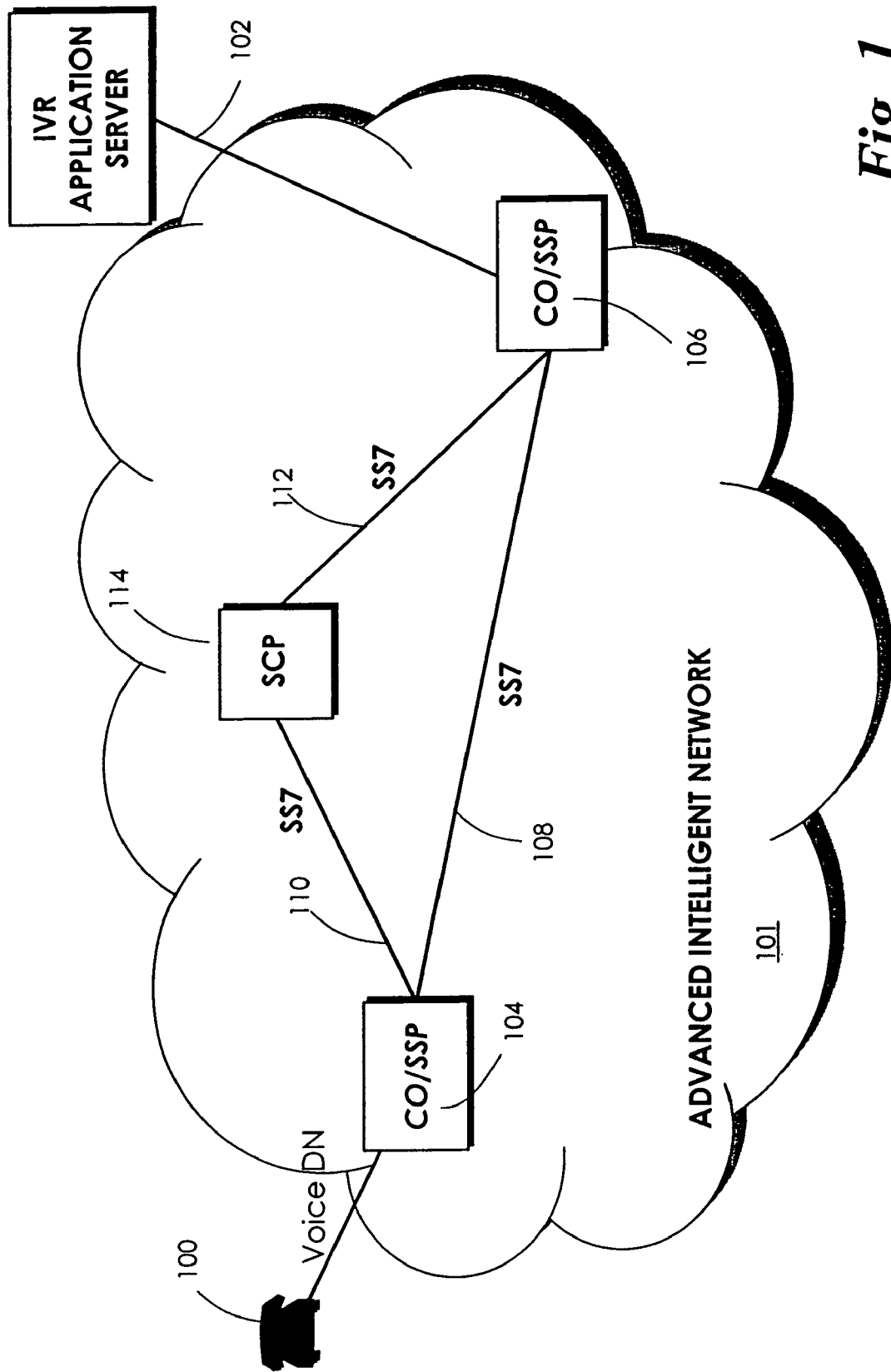
FIG. 1 is a block diagram depicting a conventional Advanced Intelligent Network connection between a voice line telephone and an Interactive Voice Response server.

FIG. 1 is a block diagram depicting a conventional Advanced Intelligent Network connection between a voice line telephone 100 and an Interactive Voice Response (IVR) server 102. Modern telephone switching conforms to a telecommunications protocol referred to as Signaling System 7 (SS7). The Advanced Intelligent Network (AIN) 101 is a telecommunications switching network that utilizes the SS7 protocol to connect switching centers and other telecommunications resources to provide call routing and various other services to telephone users. Essentially, the AIN 101 is a collection of telecommunications components and interconnections that support the generation of AIN messages known as triggers and enable the components to respond to generated triggers by generating responsive messages or by executing an instruction. The voice line telephone 100 is connected to the AIN 101 at a Central Office switch 104. The Central Office switch 104 is also referred to as Service Switching Point (SSP). The Central Office switch 104 will, hereinafter, be referred to as the SSP 104. A Central Office Switch 104 may have a plurality of subscriber lines connected thereto. The AIN can have an indefinite number of SSP's 104, 106. The SSP's 104 and 106 communicate with each other over an SS7 protocol data communication link 108 and with other AIN telecommunications components over other SS7 data links 110, 112.

Much of the intelligence utilized by the AIN 101 to switch calls and provide other telecommunications services resides in a Service Control Point (SCP) 114. As is known to those skilled in the art, SCPs were initially integrated into the AIN 101 to handle message translations and billing transactions for the implementation of 800-number services. An 800 number subscriber has at least one directory number (DN) that can be called by a telephone user. Because there is no physical central office or geographic area that corresponds to the 800 area code, it is more economical to provide a few central locations at which a lookup of the directory number for an 800 call can be made, than to provide the requisite translation information at all SSPs. SCPs may have associated databases for directory numbers corresponding to functional 800 numbers.

SCPs also may have databases that identify customers that are subscribers to one or more telecommunication services (e.g., caller ID). In order to maximize the efficiency of processing data and calls at each SSP 104, 106, a relatively small set of triggers are defined for each call and/or service. A trigger in the AIN 101 is an event associated with a particular subscriber line that generates a data packet to be sent to an SCP. The trigger is usually generated by an SSP and causes the SCP to query one or more of its associated databases to determine whether some calling feature or service should be implemented for a particular call. The results of this database query are returned to the SSP 104, 106 from the SCP 114 in a return data packet. The return data packet includes instructions to the SSP 104, 106 as to how to process the call. The instructions may be to take some special action as a result of a calling feature or service, or may simply be an indication that there is no entry in the database that indicates that anything other than ordinary telephone switching should be provided for the call. In short, the SCP 114 is a sophisticated, computerized switching system that responds to data packets and/or triggers over the SS7 data links 110, 112 to route calls and to interconnect telecommunications components and AIN users to provide telecommunications services.

In summary, the AIN is a complex, high-speed, high call volume, packet-switched messaging system that provides a great deal of versatility in the handling of telephone calls. The SSP switch will generate a trigger and then wait for a response from the SCP 114 before proceeding with call processing. More detailed information regarding the AIN 101 can be found in U.S. Pat. No. 5,430,719, which is commonly assigned to BellSouth Intellectual Property Management Corporation and is incorporated herein by reference.

In the example depicted in FIG. 1, a user of the telephone 100 can contact an IVR application server 102 by dialing a directory number associated with the IVR server. A telecommunication path can be created between the telephone 100 and the IVR server 102 via the AIN 101. The IVR server 102 can be used to provide automated information to the user of the telephone 100. Such information might include stock quotes, bank records, or customer service information. Typically, an IVR server 102 will utilize a menu-driven system that will respond to key punches (known as DTMF key codes) entered on the telephone 100. For example, the IVR server may send a message to the telephone 100 that includes a list of options. The user of the telephone 100 may select an option by entering a number on the keypad of the telephone 100. The IVR server 102 may respond to the entry by providing the user with an audible message the selected information (e.g., a current stock quote) or may provide the user with another list of options that pertain to the user's previously selected option. Thus, a user can access an automated voice-based information delivery system hosted by the IVR server 102, via the AIN 101.

Figure 2:
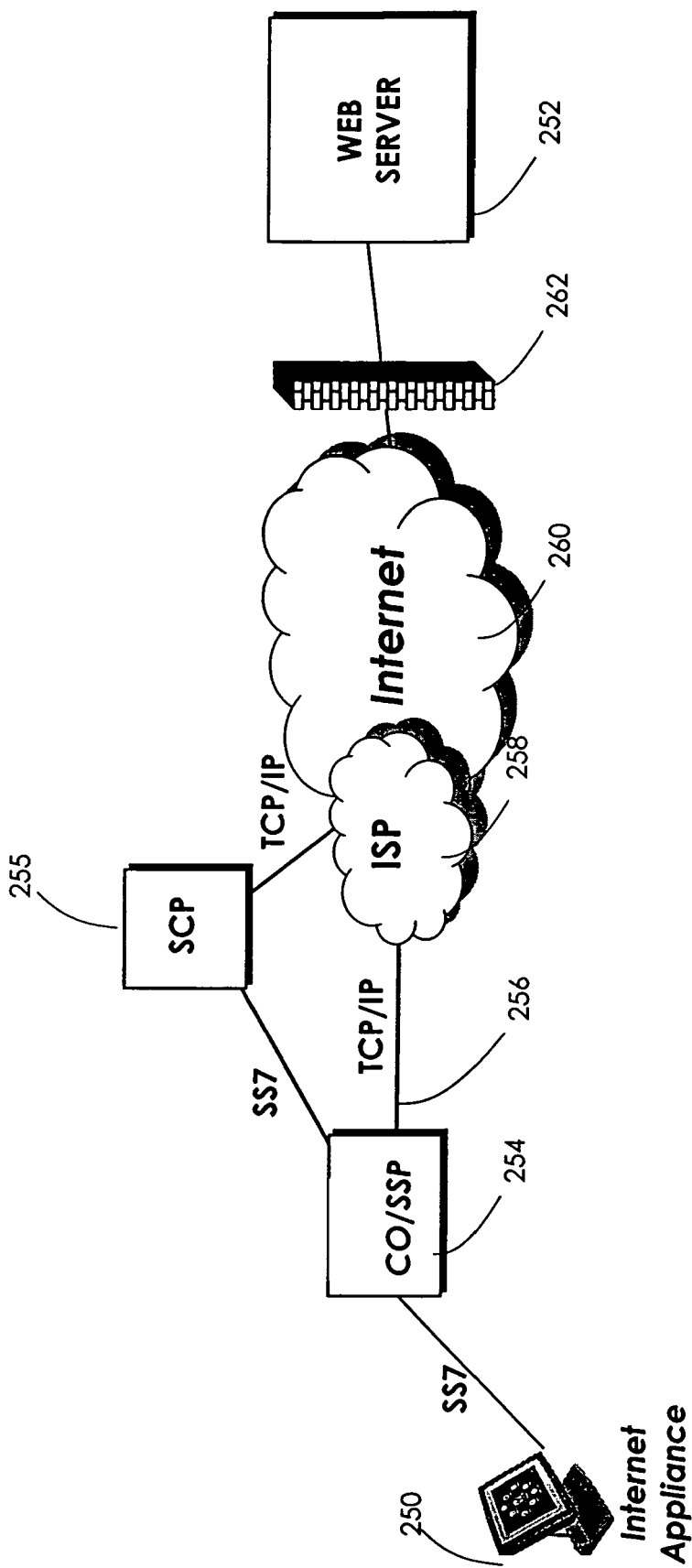
FIG. 2 depicts a conventional connection between a networking device and a web server.

FIG. 2 depicts a conventional connection between a networking device 250 and a web server 252. Typically, the networking device 250 can connect to the web server 252 via an SSP 254 connection to an Internet Service Provider (ISP) 258. The Internet appliance 250 can initiate the connection by dialing a directory number of the ISP 258 and initiating a conventional login procedure. The connection between the SSP 254 and the ISP 258 may be over a TCP/IP connection 256 or via an SS7 connection to an SCP 155. The SCP 155 may be connected to the ISP 258 via another TCP/IP connection or via an SS7 connection. The ISP 258 can connect to the web server 252 via an IP Network (e.g., the Internet 260) in the conventional manner. A security firewall 262 may protect the web server 252 from unauthorized access over the Internet 260.

Accordingly, the Internet appliance 250 and the conventional telephone 100 can utilize the AIN to gain access to the web server 252. In an exemplary embodiment of the present invention, the connection between the Internet appliance 250 and the web server 252 and the connection between the telephone 100 (FIG. 1) and the IVR application server 102 (FIG. 1) can be coordinated so that a single user of the telephone 100 and of the Internet appliance 250 can simultaneously access the functionality of both the IVR application server and the web server.

An Exemplary Visual IVR System

An exemplary embodiment of the present invention provides a synchronized, simultaneous telephony-based and visual presentation of IVR applications. This integrated telephony-based and Internet-based presentation of IVR applications is referred to as Visual IVR or VIVR. VIVR provides users with convenient access to automated information delivery systems hosted by a VIVR Server. This results in more efficient and more effective interaction between a user/consumer and the automated information delivery system in the context of a VIVR session. Automated information delivery system providers can augment telephony based information delivery with Internet-based (i.e., visual-based) information delivery to enhance the provider's automated information delivery system. Similarly, web site operators can augment a web site with telephony-based (i.e., voice based) information delivery to enhance the ability of users to navigate the web site by, for example, providing a voice-based help system.

A typical VIVR session may be enabled when the user connects to the user's ISP. Upon connection, the user may navigate to the website of a VIVR provider (VIVR Server host). The website may inform the user that simultaneous audio and visual information can be provided to assist the user. Then, the user may use a conventional telephone to establish a telephony-based connection to the VIVR host. In one embodiment of the present invention, the telephony network may be used to play an announcement inviting the user to initiate a VIVR session.

If the user selects to enable VIVR, then the automated information will be presented to the user simultaneously, visually and audibly. That is, the user will be presented with the information on the user's networking device as well as on the user's telephone. Notably, the user may disable the telephony-based access, the visual-based access, or both access points at any time.

Figure 3:
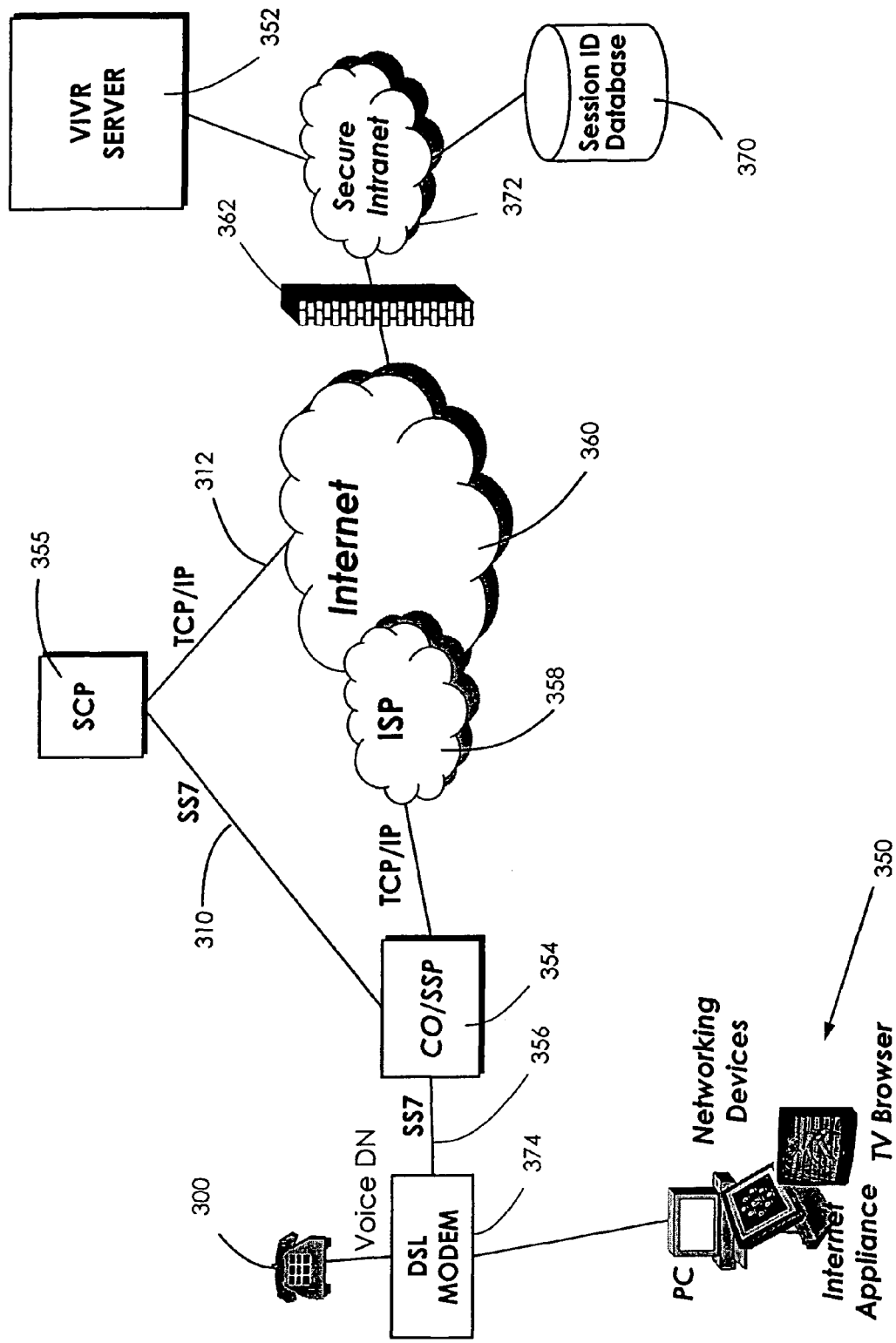
FIG. 3 is a block diagram depicting a Visual Interactive Voice Response automated information delivery system that is an exemplary embodiment of the present invention.

FIG. 3 is a block diagram depicting a Visual IVR (VIVR) automated information delivery system that is an exemplary embodiment of the present invention. The system depicted in FIG. 3 uses a VIVR Server 352 to provide automated information delivery to a user of a telephone 300. This system also can be used to provide automated information delivery to a personal computer, Internet appliance, or T.V. browser (collectively, networking device 350), via a network connection (e.g., an Internet connection). The telephone 300 and the networking device 350 may be connected to an SSP 354 over separate telephone lines or over a single telephone line utilizing a conventional Asymmetric Digital Subscriber Line (ADSL) modem 374. Those skilled in the art will appreciate that any connection to the AIN would enable the implementation of exemplary embodiments of the present invention.

VIVR refers to the integration of voice-based and Internet-based automated information delivery systems. By using a networking device 350, a user can initiate a VIVR session by connecting to the VIVR Server 352 via the Internet 360. In the embodiment of the present invention depicted in FIG. 3, the VIVR Server 352 is accessed through a secure intranet 372 that is protected from unauthorized users by a firewall 362.

A VIVR session may begin when a telephone call to an ISP is initiated by the networking device 350 and initially processed by the SSP 354 associated with the ISP. As part of a dial-up procedure, the networking device 350 may send an AIN feature code trigger to the SSP that will, in turn, cause the SSP to generate a trigger, such as the well-known TCAP INFO ANALYZED QUERY to the SCP 355, via SS7 data link 310. The feature code trigger also can be generated as part of a preconfigured login procedure. The SCP 355 can then instruct the SSP 354 to route the call to the ISP 358. The SCP 355 may also instruct the SSP 354 to notify the SCP 355 when the call is terminated by the networking device 350. The SSP 354 will then route the call to the ISP 358.

The SSP 354 will receive a data packet from the networking device 350. The data packet may include the Internet directory number (DN), the Internet protocol (IP) address of the networking device 350, and the voice DN. A directory number is simply the telephone number assigned to the telephone line used by the networking device to connect to the network. As discussed above, the telephone 300 and the networking device 350 may be connected to the SSP over separate telephone lines. In the case where two lines are used to connect the telephone 300 and the networking device 350, the Internet DN and the voice DN will be distinct. However, in the case where the telephone 300 and the networking device 350 are connected over the same telephone line (e.g., using a DSL modem 374), the Internet DN and the voice DN may be identical. The SCP 355 can store the data packet in association with a VIVR Session ID in a Session ID database 370. The SCP 355 can access the Session ID database 370 via TCP/IP data link 312 and the secure intranet 372. The presence of a Session ID in the Session ID Database indicates that the networking device 350 is equipped to support a VIVR Session.

An Exemplary Method for Providing Visual and Audible Information

Figure 4:
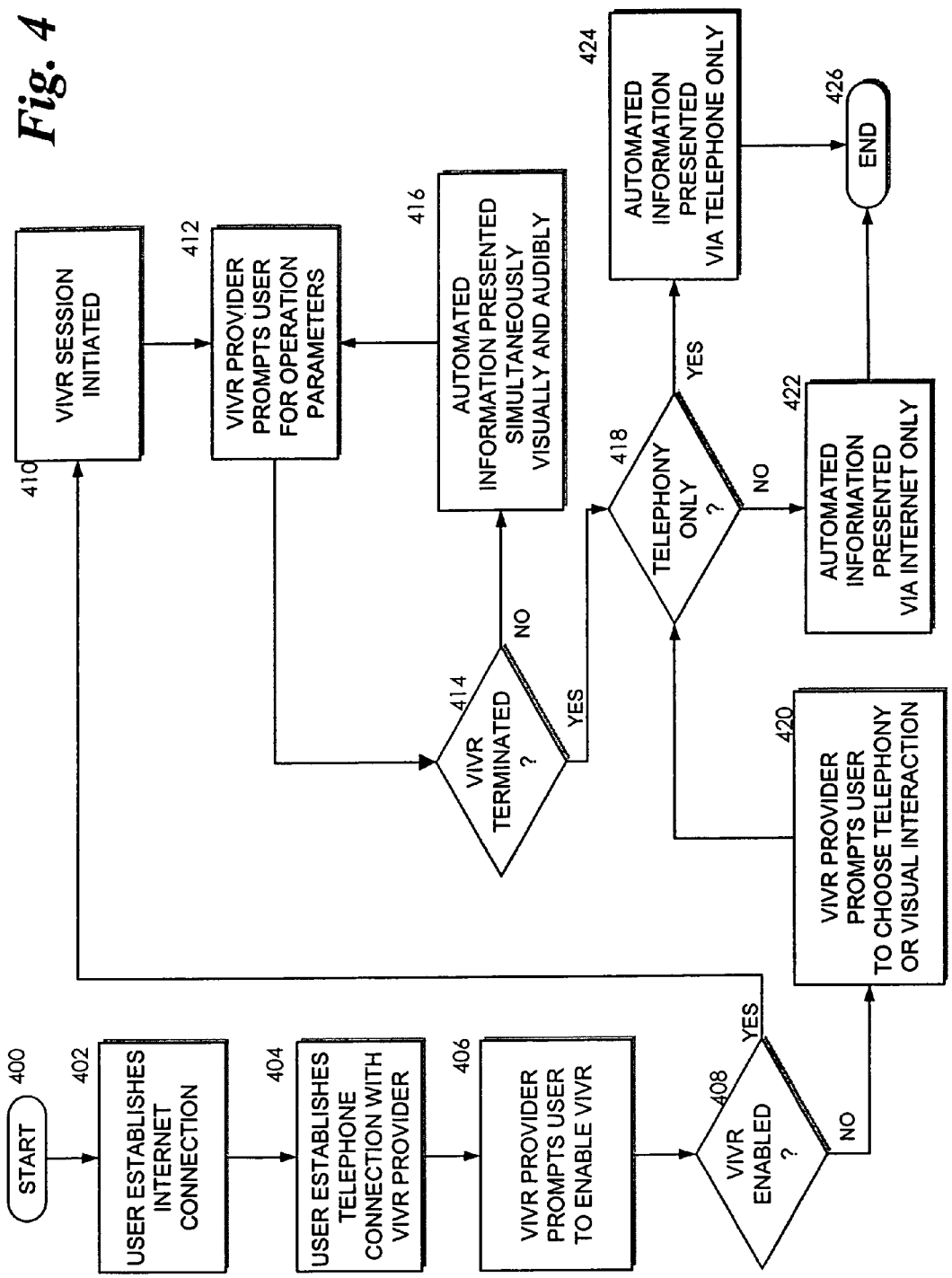
FIG. 4 is a flow chart depicting an exemplary method for initiating and terminating a VIVR session.

FIG. 4 is a flow chart depicting a generalized method for initiating and terminating an exemplary VIVR session. A more detailed method is described in connection with FIG. 7. The method begins at step 400 and proceeds to step 402. At step 402, the user establishes an Internet connection with the VIVR provider. The method then proceeds to step 404 and the user establishes a telephone connection with the VIVR provider. Because the user has established both an audio-based connection (via telephone) and a visual-based connection (via Internet), a VIVR session can be supported. The VIVR provider prompts the user by telephone to enable a VIVR Session at step 406. That is, the VIVR provider invites the user to initiate a VIVR session. In an exemplary embodiment of the present invention, the VIVR provider can determine whether the VIVR Session can be supported by determining whether the user has an active Internet connection.

The method proceeds from step 406 to decision block 408. At decision block 408, a determination is made as to whether VIVR has been enabled. If the user has not enabled a VIVR session, the method proceeds from decision block 408 to step 420. At step 420, the VIVR provider prompts the user to choose between a telephony-based or a visual-based interaction. Because the user has chosen not to initiate a VIVR session (at decision block 408), the provider allows the user to proceed with accessing the automated information delivery system by a conventional, telephony-based IVR session or by use of the provider's Internet website. The method proceeds from step 420 to decision block 418. At decision block 418, a determination is made as to whether the user has selected to initiate a conventional, telephony-based IVR session only. If the user has selected a telephony-only session, the method proceeds from decision block 418 to step 424. At step 424, the automated information is presented via telephone only. The method then proceeds to step 426 and ends.

Returning now to decision block 418, if a determination is made that the user has selected an Internet-based session only, the method branches from decision block 418 to step 422. At step 422, the automated information is presented to the user via an Internet-based session only. The method then proceeds to step 426 and ends.

Returning now to decision block 408, if a determination is made that the user has enabled a VIVR session, the method branches to step 410 and a VIVR session is initiated. The method then proceeds to step 412 and the VIVR provider prompts the user for operation parameters. These parameters may be made available to the user on a continuous basis throughout the duration of the VIVR session. The operation parameters may include terminating the telephony connection, terminating the Internet connection, redirecting the telephony information to a networking device-based speaker and/or microphone and other operating parameter options.

The method proceeds from step 412 to decision block 414. At decision block 414, a determination is made as to whether the VIVR session has been terminated. If, for example, the user terminates either the Internet connection or the telephonic connection, the VIVR session will be terminated, in that the simultaneous presentation of visual and audible information will be terminated.

If a determination is made at decision block 414 that the VIVR session has not been terminated, the method proceeds to step 416. At step 416, the automated information is presented simultaneously visually and telephonically. The method then loops back to step 412 and proceeds as described above until the VIVR session is terminated.

If, at decision block 414, a determination is made that the VIVR session has been terminated, the method branches from decision block 414 to decision block 418. At decision block 418, a determination is made as to whether the user has selected a telephone-only session (conventional IVR session). The method branches from decision block 418 to either step 422 or step 424, as described above.

An Exemplary VIVR System Employing a Voice XML Gateway

Figure 5:
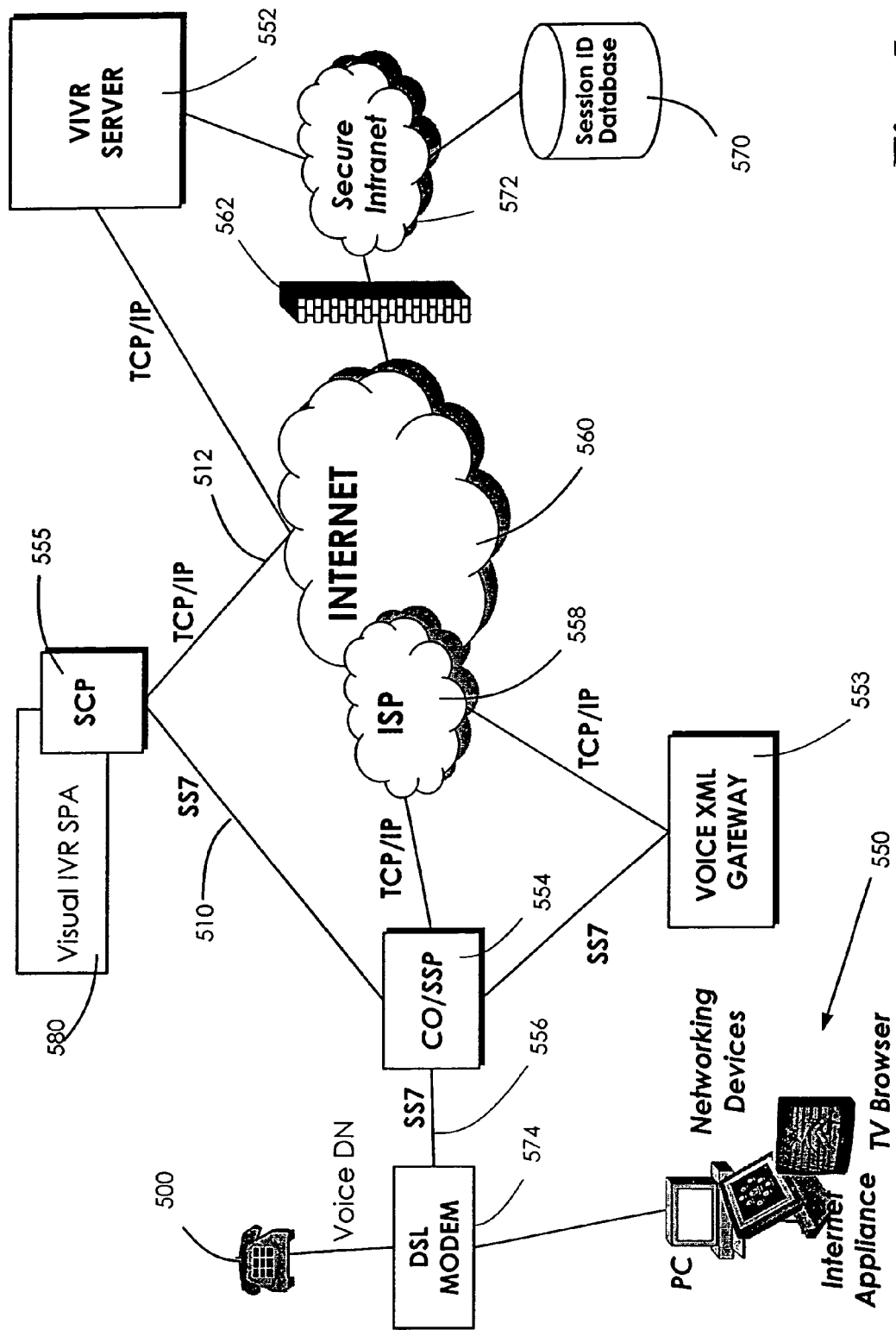
FIG. 5 is a block diagram of an exemplary embodiment of the present invention that employs a Voice XML gateway.

FIG. 5 is a block diagram of an exemplary embodiment of the present invention that employs a Voice XML (VXML) gateway 553. Voice Extensible Markup Language (VXML) is an XML derivative that is a communications standard directed to delivering Internet content and data that is accessible through voice-based devices (e.g., conventional telephone). One objective of the VXML standard is to provide speech-enabled applications over the Internet. Typically, VXML is implemented in applications involving speech recognition in which spoken commands are used to access information or complete transactions. Similarly, VXML can be used to deliver Internet content to a voice-based device in an audible format. For example, an IVR menu may be stored in text-only format in an IVR server. That text can be processed by the VXML Gateway 553 and delivered to the telephone 500 as an audible message.

The VXML Gateway can convert the text-based data received from the VIVR Server 552 to audio-based content via known text-to-speech algorithms. Pre-stored audio files, such as ".wav" files may also be used. The VXML Gateway 553 may then play back the audio file over a connection with the telephone 500, established through the SSP 554. Those skilled in the art will appreciate that while the present invention is described as using the VXML communications standard, other communications standards could be used to implement alternative embodiments of the present invention.

The VXML Gateway 553 also can be used to interpret commands sent by a user, via the telephone 500. The interpreted commands can be converted to an instruction that can be delivered to the VIVR Server 552. In one embodiment of the present invention, the VXML Gateway 553 may employ a look-up table to correlate or translate received audible instructions with data-formatted instructions that are meaningful to the VIVR Server 552. Thus, the VIVR Server 552 can use the VXML Gateway to deliver text-based information to a user in an audible format and to interpret audible instructions from the user. Among other advantages, this enables a simplification of the functionality of the VIVR Server 552.

When a user of the telephone 500 wishes to begin an IVR session, the user can dial a conventional telephone number to contact the VIVR Server's host. If the user has an active Internet connection, the call can be connected to the VXML Gateway 553 by the conventional AIN components, including the SSP 554 and the SCP 555. The SCP 555 can be used to route the call to the VXML Gateway 553, in response to a trigger fired by the SSP. Accordingly, a conventional IVR (i.e., telephony only) session can be established between the telephone 500 and the VIVR Server 552. The VXML Gateway 553 communicates with the VIVR Server 552 via TCP/IP communication links. The VXML Gateway 553, thereby, enables the communication between the telephone 500 and the VIVR Server 552. The VIVR Server 552 can prompt the user of the telephone 500 to choose between continuing a telephony-only IVR session or establishing simultaneous visual and telephonic access to the information delivered by the VIVR Server.

The VIVR Server 552 utilizes the VXML Gateway 553 via a TCP/IP communication link. The VIVR Server 552 can deliver data to the VXML Gateway, which will then deliver an audible version of the data to the telephone 500. Advantageously, the VIVR Server 552 can use the same data sent to the VXML Gateway 553 to generate audible messages to the telephone 500 to generate visually-formatted data for a networking device 550. A more detailed description regarding this functionality is provided in connection with FIG. 6.

A user may initiate a VIVR Session with the VIVR Server 552 by establishing an Internet-based (i.e., visual-based) session in addition to the telephony-based connection. The user can gain Internet-based accessed to the VIVR Server's host (not-shown) by accessing the user's Internet Server Provider (ISP) 558 in the conventional way and then logging into a website maintained by the VIVR Server host. The login procedure and/or a dial-up sequence may be automatically or manually generated by the networking device 550 to indicate that the user of the networking device intends to establish a VIVR session. The ISP 558 can store a VIVR Session ID in a Session ID database 570. The VIVR Session ID indicates that the networking device 550 is online and able to establish and conduct a VIVR session.

Those skilled in the art will appreciate that various forms of the VIVR Session ID could be used to implement various embodiments of the present invention. In an exemplary embodiment, the VIVR Session ID includes the Internet directory number corresponding to the networking device 550, the Internet protocol address (IP address) of the networking device, and the voice directory number associated with the networking device. The Internet directory number is the telephone number associated with the telephone line through which the networking device 550 has gained access to the ISP 558. This number is known by the relevant AIN components and can be obtained from the SSP 554. Likewise, the voice directory number is a telephone number that is associated with the Internet directory number. In the case of a DSL connection, the Internet directory number and the voice directory number may be identical. Otherwise, the Internet directory number and the voice directory number are distinct, such as would be the case where a user is using separate lines for Internet access and conventional telephone access. The IP address is typically assigned to the networking device 550 by the ISP 558.

When a user contacts the VIVR Server host via the telephone 500, the user may select to establish a VIVR session (i.e., visual and telephonic access) when prompted. In the case where a user selects to establish a VIVR session, a VIVR Application 580 running on the SCP 555 can determine whether a VIVR Session ID exists for the user in the Session ID database 570. The VIVR Application 580 makes this determination by first determining the voice directory number of the connected user. The voice directory number can then be compared to the Session ID database 570 to determine whether a Session ID containing the voice directory number exists. If such a Session ID exists, the VIVR application 580 knows that the networking device 550 associated with the telephone 500 is online and able to establish a VIVR session. The VIVR Application 580 can then cause the SCP 555 to route the telephone call to the VXML Gateway 553. The VXML Gateway 553 may then prompt the user to choose whether to establish a VIVR session.

If a user elects to establish a VIVR session, the VXML Gateway 553 may retrieve the requested information from the VIVR Server 552 for delivery as audible information to the telephone 500. The VXML Gateway 553 will instruct the VIVR Server 552 to deliver visual information directly to the networking device 550 in a format suitable for visual representation (e.g., HTML).

Figure 6:
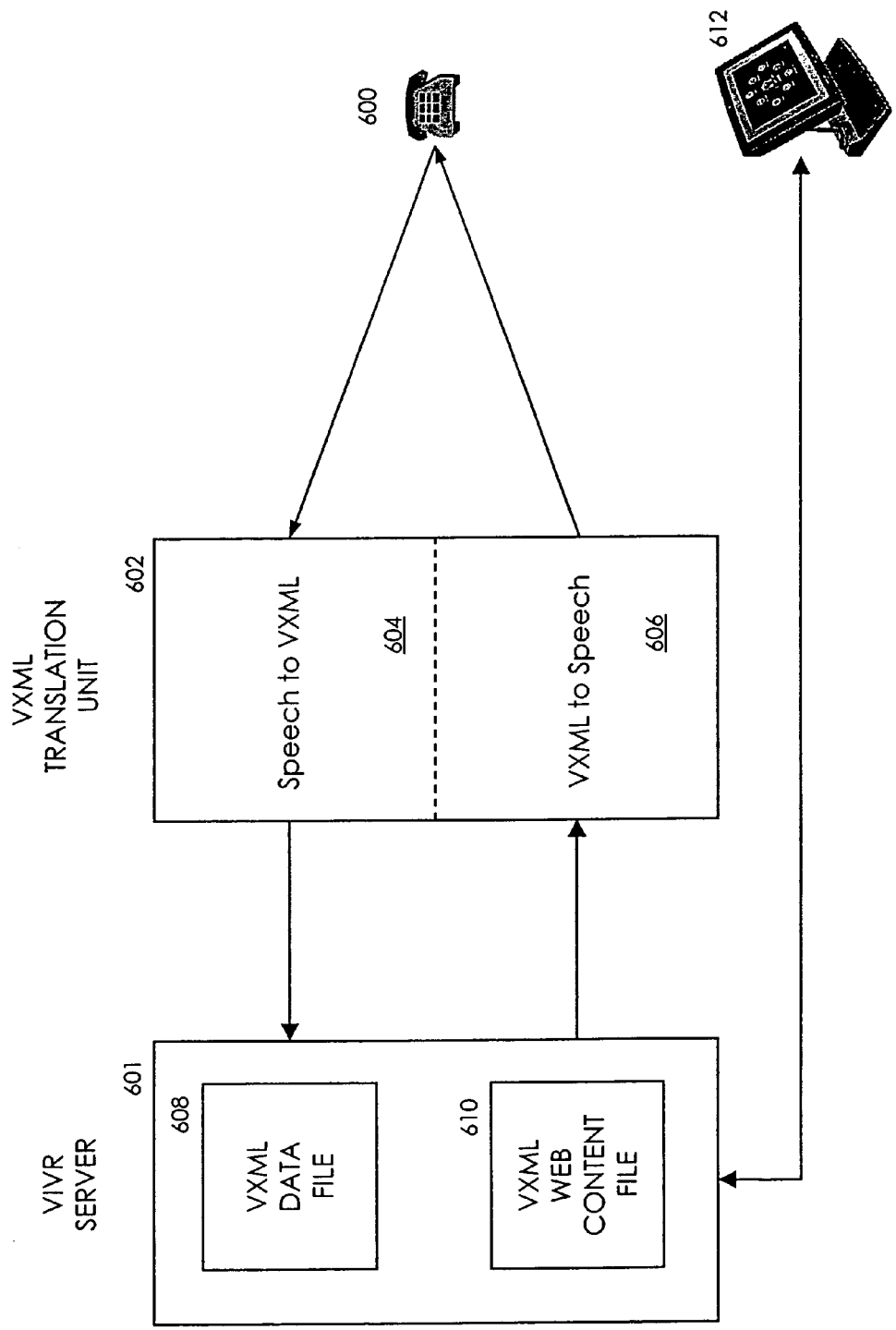
FIG. 6 is a block diagram depicting the interaction between an exemplary VIVR Server and an exemplary VXML translation unit.

FIG. 6 is a block diagram depicting the interaction between an exemplary VIVR Server 601 and an exemplary VXML translation unit 602 that may be part of a VXML Gateway. The VIVR Server 601 can maintain VXML data in a VXML data file 608. The VIVR Server may also maintain VXML web content in a separate VXML web content file 610. Those skilled in the art will appreciate that the VXML data file 608 and the VXML web content file may be the same file. The VIVR Server 601 can transmit VXML data to the VXML translation unit 602. The VXML translation unit 602 has a VXML to Speech sub-component 606 that translates the VXML data to an audible message. The audible message can then be delivered to the telephone 600. The VXML translation unit 602 also can receive spoken message or audible messages from the telephone 600 and process these messages through a Speech to VXML sub-component 604. Once translated to VXML, the message from the telephone 600 can be delivered to the VIVR Server 601. Advantageously, the VXML web content can be delivered directly to a networking component 612 or can be delivered to the networking component via the VXML translation unit 602. In either case, the VIVR Server can deliver the same content to the telephone 600 and to the networking device 612.

Although the VXML data file 608 and the VXML web content file 610 are depicted as separate components in the VIVR Server 601, those skilled in the art will appreciate that one of the advantages of XML data is that the same XML data can be used to generate an audible message and an HTML-formatted web page. Because VXML is a derivative of XML, VXML also can be implemented in such a way as to benefit from this advantage.

An Exemplary Method for Providing a VIVR Session

Figure 7:
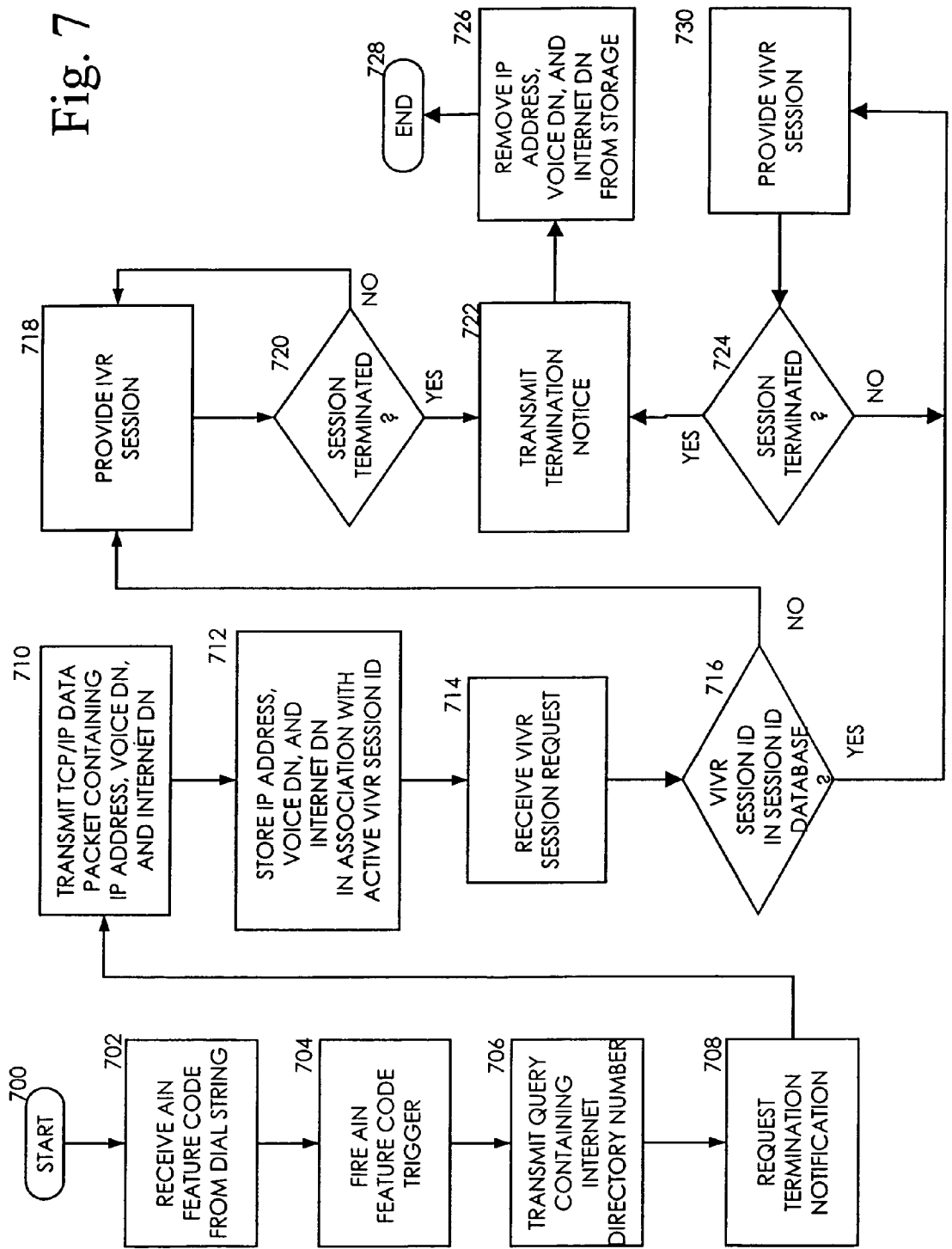
FIG. 7 is a flow chart depicting an exemplary method for providing simultaneous visual and telephonic access to an exemplary VIVR system.

FIG. 7 is a flow chart depicting an exemplary method for providing simultaneous visual and telephonic access to an exemplary Visual Interactive Voice Response (VIVR) system. The method of FIG. 7 can be used to establish a conventional IVR session and/or a Visual IVR session. The method begins at step 700 and proceeds to step 702. At step 702, an AIN feature code is received from a dial string. The feature code may be embedded in a dialing string that is dialed by a networking device to connect to an ISP. Alternatively, the AIN feature code may be generated during a login procedure where, for example, a networking device logs into a website maintained by the VIVR Server host. The method proceeds from step 702 to 704.

At step 704, an AIN feature code trigger is fired. As described above, the AIN feature code trigger may be fired by an SSP to trigger a response from an SCP. The method proceeds from step 704 to step 706, wherein a query containing an Internet directory number is transmitted. This step may be performed by an SCP, in response to receiving a trigger generated by an SSP. The Internet directory number can correspond to the networking device that generated the AIN feature code.

The method proceeds from step 706 to step 708. At step 708, a termination notification is requested. This step may be performed by an SCP to determine when the networking device is no longer able to establish a VIVR session. For example, if the networking device is disconnected from an associated ISP, the SSP may generate the termination notice to inform the SCP of the status of the networking device. Upon receiving the termination notification from the SSP, the SCP may update the Session ID database by removing the VIVR Session ID from the Session ID database, thereby disabling any VIVR session, until the networking device is re-connected.

The method proceeds from step 708 to step 710. At step 710, a TCP/IP data packet is transmitted. The TCP/IP data packet may contain a Session ID that may include an IP address, a voice directory number, and an Internet directory number. In the system described in connection with FIG. 5, the Session ID is formulated by the telephone network. The method proceeds from step 710 to step 712, wherein the IP address, voice directory number, and Internet directory number are stored in association with an active VIVR Session ID. This information may be stored in association with the active VIVR Session ID in a Session ID database associated with the VIVR Server.

The method proceeds from step 712 to step 714. At step 714, a request for a VIVR session is received. Typically, this request will be entered by a conventional telephone user, in response to an IVR prompt. For example, the prompt may include an audible message such as "Press 1 for visual interaction, Press 2 for telephony-only." The method proceeds from step 714 to decision block 716.

At decision block 716, a determination is made as to whether a VIVR Session ID corresponding to the VIVR session request is found in a Session ID database. As described above, the voice directory number associated with the VIVR session request may be known. This voice directory number may be used to correlate the VIVR session request with a VIVR Session ID in a Session ID database. If the VIVR Session ID corresponding to the VIVR session request is found in the Session ID database, the method branches from decision block 716 to step 730.

At step 730, a VIVR session is provided, wherein both telephonic and visual access to the VIVR Server are simultaneously provided. As described above, the telephonic-based information may be conveyed to the telephone via a VXML Gateway, while the visual information may be transmitted via a TCP/IP connection to a networking device. The method proceeds from step 730 to decision block 724, wherein a determination is made as to whether the session is terminated. As described above, such a termination may include the termination of the voice telephone connection, the termination of the Internet connection, or both. If no such session termination has occurred, the method will branch back to step 730 and the VIVR session will be provided until such termination occurs.

If, at decision block 724, a determination is made that the VIVR session is terminated, the method branches to step 722. At step 722, a termination notice is transmitted. This step may be performed by the SSP, whereby the SSP transmits a message (e.g., TCAP TerminationNotification Message) containing the user's Internet directory number to an SCP. The method proceeds from step 722 to step 726. At step 726 the IP address, voice directory number, and the Internet directory number are removed from storage. Typically, this step will be performed by the SCP in cooperation with the Session ID database. In any event, this information will be removed from the Session ID database, indicating that the identified networking device is no longer able to establish and/or maintain a VIVR session. The method proceeds from step 726 to step 728 and ends.

Returning now to decision block 716, if a determination is made that no VIVR Session ID exists in the Session ID database, the method branches from decision block 716 to step 718. At step 718, a conventional IVR session is provided. Notably, a VIVR session is not and cannot be provided, because the absence of a VIVR Session ID indicates that the networking device associated with the voice directory number is not capable of establishing and/or maintaining a VIVR session. In most cases, this means that the networking device is not connected to the Internet.

The method proceeds from step 718 to decision block 720. At decision block 720, a determination is made as to whether the IVR session is terminated. If the IVR session is not terminated, the method branches back to step 718 and the IVR session is continued until such a termination occurs. If, at decision block 720, a determination is made that the session has been terminated, the method branches to step 722. At step 722, a termination notice is transmitted as described above. The method then proceeds to step 726, wherein the IP address, the voice directory number, and the Internet directory number are removed from the Session ID database. The method then proceeds to step 728 and ends.

In an exemplary embodiment of the present invention, a user can initiate a VIVR Session by calling the telephone number of a VIVR host. An AIN trigger (e.g., in an SSP associated with the VIVR host) may be configured to fire any time the VIVR host's telephone number is dialed. In response to the firing of the trigger, a query (e.g., TCAP InfoAnalyzed) is sent to an SCP. The query contains the user's directory number, which is a telephone number associated with the telephone on which the user is calling. The SCP returns an AIN responsive message to the SSP. The message may be an Analyze Route message with a Send Notification to the SSP. The trigger may cause the SCP to determine whether the user has an active Internet connection that can support a VIVR Session. These are well known AIN messages and operate to indicate to the SSP that the call should be routed to a VXML Gateway and also operate to instruct the SSP to notify the SCP when the call ends.

The SCP recognizes that the TCP/IP message corresponds to an active Internet connection, because the Internet directory number is in the SCP's Session ID database. The Internet directory number is in the SCP database, because the SCP stored the Internet directory number, in response to the firing of the AIN feature code trigger when the user established the active Internet connection. The Internet directory number, the IP address, and the voice directory number are collectively referred to as the VIVR Session ID. The SCP forwards the Session ID to a Session ID database, which stores the VIVR Session ID, indicating that a VIVR session is available to the user. When the Internet connection is terminated, the SSP sends a termination notification message (e.g., TCAP TerminationNotification) to the SCP containing the user's Internet directory number. When the SCP receives the termination notification message, the SCP transmits a request to the Session ID database to remove the VIVR Session ID.

When it is established that a VIVR Session ID is present in the Session ID database, the VIVR Server may prompt the user over a telephonic connection to select between an IVR session and a VIVR session. If the user desires to establish a VIVR session, the SCP will route the telephone call to a VXML Gateway. The SCP may set a flag indicating that the user has requested a VIVR session. For example, the SCP may use the well-known RedirectingPartyID field in an AIN message. This field may be set to all "ones" to indicate that the user has requested a VIVR session. If the user requests a telephony-only session (IVR session) the SCP will still route the call to the VXML Gateway, but will set the flag to indicate that the user has not requested a VIVR session. For example, the RedirectingPartyID field may be set to null.

If a VIVR session is not requested, the requested content may be delivered to the user's telephone via the VXML Gateway and a conventional IVR session may be conducted. The VXML Gateway can deliver content to the telephone in the form of audible messages, such as playing back ".wav" files. The user may issue speech or DTMF key code instructions to the VXML Gateway, which will forward the instructions to the VIVR Server.

If the user requests a VIVR session, the VIVR Server can deliver the XML content to the VXML Gateway and can simultaneously deliver corresponding HTML-formatted web pages to the user's networking device at the user's IP address identified in the VIVR Session ID. The XML content and the HTML content can be synchronized so that the delivery of the HTML content to the networking device occurs at or near the same time as the delivery to the VXML content to the telephone. This synchronization may be accomplished by transmitting an automated or manual notification from the networking device to the VIVR Server that the HTML content has been delivered. Upon receipt of the notification, the VIVR Server can deliver the VXML content to the telephone. The user can deliver instructions to the VIVR Server either through the telephone or through the networking device. Notably, the VIVR Server can obtain the user's IP address from the Session ID database, by performing a look-up operation, based on the voice directory number and/or the Internet directory number.

In an alternative embodiment, the VXML Gateway and/or VIVR Server may be implemented with a voice records database. The voice records database could be used to store messages for delivery to the VIVR Server host. For example, an IVR session may prompt the user to describe a problem that the user is experiencing with a product. The user's description could be stored as an audio file and then replayed by, for example, a customer service representative at a later time.

In another alternative embodiment, the VIVR Server could be equipped with a session logs database. The session logs database could be used to store a user's VIVR session. This stored session could be accessed later by the user to quickly traverse a VIVR menu or could be used by the VIVR Server host to determine user behavior and/or the most commonly sought information. The stored VIVR sessions could, thus, be used to streamline future VIVR sessions.

In yet another alternative embodiment, a secured access VIVR Server could be implemented to protect the VIVR Server host and users. For example, a user could be prompted to enter a Personal Identification Number (PIN) as a prerequisite to the initiation of a VIVR session. Such a PIN could be stored in association with a VIVR Session ID in the Session ID database.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method for initiating a visual interactive voice response session, comprising:
   generating, by a visual interactive voice response server, a session identifier in response to a network device establishing a connection with the visual interactive voice response server;
   storing the session identifier in a session identifier database;
   receiving a request from a telephone to initiate the visual interactive voice response session with the network device;
   determining, by a visual interactive voice response application, whether the session identifier generated by the visual interactive voice response server and stored in the session identifier database identifies the telephone;
   initiating the visual interactive voice response session to coordinate information delivery from the visual interactive voice response server to the telephone and the network device in response to receiving the request from the telephone and determining the session identifier identifies the telephone; and
   deleting the session identifier from the session identifier database in response to the network device terminating the connection with the visual interactive voice response server.

2. The method as set forth in claim 1, wherein the session identifier is generated in response to the visual interactive voice response server determining the network device is configured to support the visual interactive voice response session.

3. The method as set forth in claim 1, wherein:
   the visual interactive voice response session is initiated between the telephone and the network device via a voice extensible markup language gateway;
   the voice extensible markup language gateway retrieves audible information from the visual interactive voice response server and sends the audible information to the telephone; and
   the voice extensible markup language gateway instructs the visual interactive voice response server to send visual information to the network device.

4. The method as set forth in claim 1, wherein the session identifier includes an Internet protocol address of the network device, an Internet directory number of the network device and a voice directory number associated with the network device.

5. The method as set forth in claim 4, further comprising:
   determining a voice directory number of the telephone,
   wherein the determining whether the session identifier identifies the telephone includes determining whether the session identifier includes the determined voice directory number of the telephone.

6. The method as set forth in claim 1, further comprising:
   receiving, by the visual interactive voice response server, a data packet from the network device for generating the session identifier.

7. The method as set forth in claim 1, further comprising:
   prompting the telephone to initiate the visual interactive voice response session in response to determining the session identifier identifies the telephone,
   wherein the visual interactive voice response session is initiated between the telephone and the network device in response to receiving a request from the telephone to initiate the visual interactive voice response session in response to the prompting.

8. The method as set forth in claim 1, further comprising:
   prompting the telephone to initiate a telephony-based interactive voice response session in response to determining the session identifier does not identify the telephone; and
   initiating the telephony-based interactive voice response session between the telephone and the visual interactive voice response server in response to receiving a request from the telephone to initiate the telephony-based interactive voice response session in response to the prompting.

9. The method as set forth in claim 1, wherein the session identifier is generated and stored in the session identifier database in response to the network device establishing a connection with the visual interactive voice response server via the Internet.

10. A method for initiating a visual interactive voice response session, comprising:
    establishing a connection between a telephone and a visual interactive voice response host;
    establishing a connection between a network device and a visual interactive voice response server;
    generating, by the visual interactive voice response server and based on the network device, a session identifier;
    storing the session identifier in a session identifier database;
    determining, by a visual interactive voice response application, whether the session identifier stored in the session identifier database identifies the telephone;
    initiating the visual interactive voice response session to coordinate information delivery from the visual interactive voice response server to the telephone and the network device in response to the visual interactive voice response application determining that the session identifier identifies the telephone; and deleting the session identifier from the session identifier database in response to the network device terminating the connection with the visual interactive voice response server.

11. The method as set forth in claim 10, wherein the session identifier indicates that the network device is configured to support the visual interactive voice response session and includes an Internet protocol address of the network device, an Internet directory number of the network device and a voice directory number associated with the network device.

12. The method as set forth in claim 11, wherein the visual interactive voice response application determines that the session identifier identifies the telephone by determining a voice directory number of the telephone and by determining whether the voice directory number of the telephone is the voice directory number of the session identifier stored in the session identifier database.

13. The method as set forth in claim 10, further comprising:
receiving, by the telephone, audible information from a voice extensible markup language gateway, the voice extensible markup language gateway receiving the audible information from the visual interactive voice response server; and
receiving, by the network device, visual information from the visual interactive voice response server.

14. A system for initiating a visual interactive voice response session, comprising:
a visual interactive voice response server that generates a session identifier in response to a network device establishing a connection with the visual interactive voice response server;
a session identifier database that stores the session identifier;
a visual interactive voice response host that receives a request from a telephone to initiate the visual interactive voice response session with the network device;
a visual interactive voice response application that determines whether the session identifier generated by the visual interactive voice response server and stored in the session identifier database identifies the telephone,
wherein the visual interactive voice response session coordinates information delivery from the visual interactive voice response server to the telephone and the network device and is initiated in response to the visual interactive voice response host receiving the request from the telephone and the visual interactive voice response application determining that the session identifier stored in the session identifier database identifies the telephone, and
wherein the session identifier database deletes the session identifier in response to the network device terminating the connection with the visual interactive voice response server.

15. The system as set forth in claim 14, wherein the visual interactive voice response server generates the session identifier in response to determining the network device supports the visual interactive voice response session.

16. The system as set forth in claim 15, wherein:
the session identifier includes an Internet protocol address of the network device, an Internet directory number of the network device and a voice directory number associated with the network device; and
the visual interactive voice response application determines a voice directory number of the telephone and determines whether the session identifier stored in the session identifier database identifies the telephone by determining whether the session identifier includes the determined voice directory number of the telephone.

17. The method as set forth in claim 1, further comprising:
deleting the session identifier from the session identifier database in response to the visual interactive voice response session being terminated.

18. The method as set forth in claim 10, further comprising:
deleting the session identifier from the session identifier database in response to the visual interactive voice response session being terminated.

19. The system as set forth in claim 14, wherein the session identifier database deletes the session identifier in response to the visual interactive voice response session being terminated.

20. The system as set forth in claim 14, wherein:
the visual interactive voice response session is initiated between the telephone and the network device via a voice extensible markup language gateway;
the voice extensible markup language gateway retrieves audible information from the visual interactive voice response server and sends the audible information to the telephone; and
the voice extensible markup language gateway instructs the visual interactive voice response server to send visual information to the network device.

* * * * *